US008588771B2

(12) United States Patent
Costa et al.

(10) Patent No.: US 8,588,771 B2
(45) Date of Patent: Nov. 19, 2013

(54) METHOD OF PROVIDING ACCESS TO AN IP MULTIMEDIA SUBSYSTEM

(75) Inventors: Mauro Costa, Milan (IT); Walter Munarini, Vicenza (IT); Maurizio Monti, Milan (IT)

(73) Assignee: Vodafone Group PLC, Newbury (GB)

( * ) Notice: Subject to any disclaimer, the term of this patent is extended or adjusted under 35 U.S.C. 154(b) by 1724 days.

(21) Appl. No.: 11/681,223

(22) Filed: Mar. 2, 2007

(65) Prior Publication Data

US 2008/0020704 A1   Jan. 24, 2008

(30) Foreign Application Priority Data

Mar. 13, 2006   (EP) .................................... 06005042

(51) Int. Cl.
*H04W 4/00* (2009.01)
(52) U.S. Cl.
USPC ..................... 455/432.1; 455/406; 455/432.3; 455/433; 370/352; 370/356; 370/401
(58) Field of Classification Search
USPC ................. 370/328, 352–356, 401; 455/3.06, 455/405–408, 432.1–435.3, 558, 445
See application file for complete search history.

(56) References Cited

U.S. PATENT DOCUMENTS

| | | | | |
|---|---|---|---|---|
| 6,885,861 B2 * | 4/2005 | Koskelainen | ............... | 455/414.2 |
| 7,062,270 B1 * | 6/2006 | Dalvie et al. | ................... | 455/433 |
| 7,689,203 B2 * | 3/2010 | Zhang et al. | ................... | 455/406 |
| 7,764,947 B2 * | 7/2010 | Koskinen et al. | ............. | 455/405 |
| 7,782,788 B2 * | 8/2010 | Ahlback et al. | ............... | 370/252 |
| 7,860,748 B2 * | 12/2010 | Vallinen et al. | ............... | 455/405 |
| 7,940,904 B2 * | 5/2011 | Cai et al. | ................... | 379/114.28 |
| 8,175,575 B2 * | 5/2012 | Cai et al. | ........................ | 455/406 |
| 8,437,342 B2 * | 5/2013 | Jonsson et al. | ................ | 370/356 |
| 2003/0128693 A1 * | 7/2003 | Segal | ............................. | 370/352 |
| 2003/0143996 A1 * | 7/2003 | Peglion | ......................... | 455/432 |
| 2004/0087305 A1 * | 5/2004 | Jiang et al. | ................. | 455/432.1 |
| 2004/0146040 A1 * | 7/2004 | Phan-Anh et al. | ............ | 370/349 |

(Continued)

OTHER PUBLICATIONS

3GPP: "Universal Mobile Telecommunications System (UMTS); Telecommunication management; Charging management; IP Multimedia Subsystem (IMS) charging 93GPP TS 32.260 version 6.4.0 Release 6) ETSI TS 132 260" ETSI Standards, European Telecommunications Standards Institute, Sophia-Antipo, FR, vol. 3-SA5, No. V640, Dec. 2005, pp. 1-60, XP014032801 ISSN: 0000-0001 paragraph [005.]—paragraph [5.2.2.1.2.] paragraph [6.1.3.3.].

(Continued)

*Primary Examiner* — Sharad Rampuria
(74) *Attorney, Agent, or Firm* — Notaro, Michalos & Zaccaria P.C.

(57) ABSTRACT

A method of providing access to an IP multimedia subsystem (IMS) for a subscriber (UE) comprises the steps of providing an home interface entity (HGGSN) with access network data (MCC',MNC') identifying the access communication network (AN), sending a message comprising the access network data (MCC',MNC') from an home interface entity (HGGSN) to serving means (HSS), comparing the home network data (MCC,MNC) and the access network data (MCC',MNC'), checking if the subscriber (UE) is allowed to roam based on a set of predefined criteria when the result of the comparing step is false, and sending a message comprising the access network data (MCC',MNC') to at least one of call state control functionality means (CSCF) when the result of the checking step is true.

14 Claims, 2 Drawing Sheets

(56) References Cited

U.S. PATENT DOCUMENTS

Figure 1:
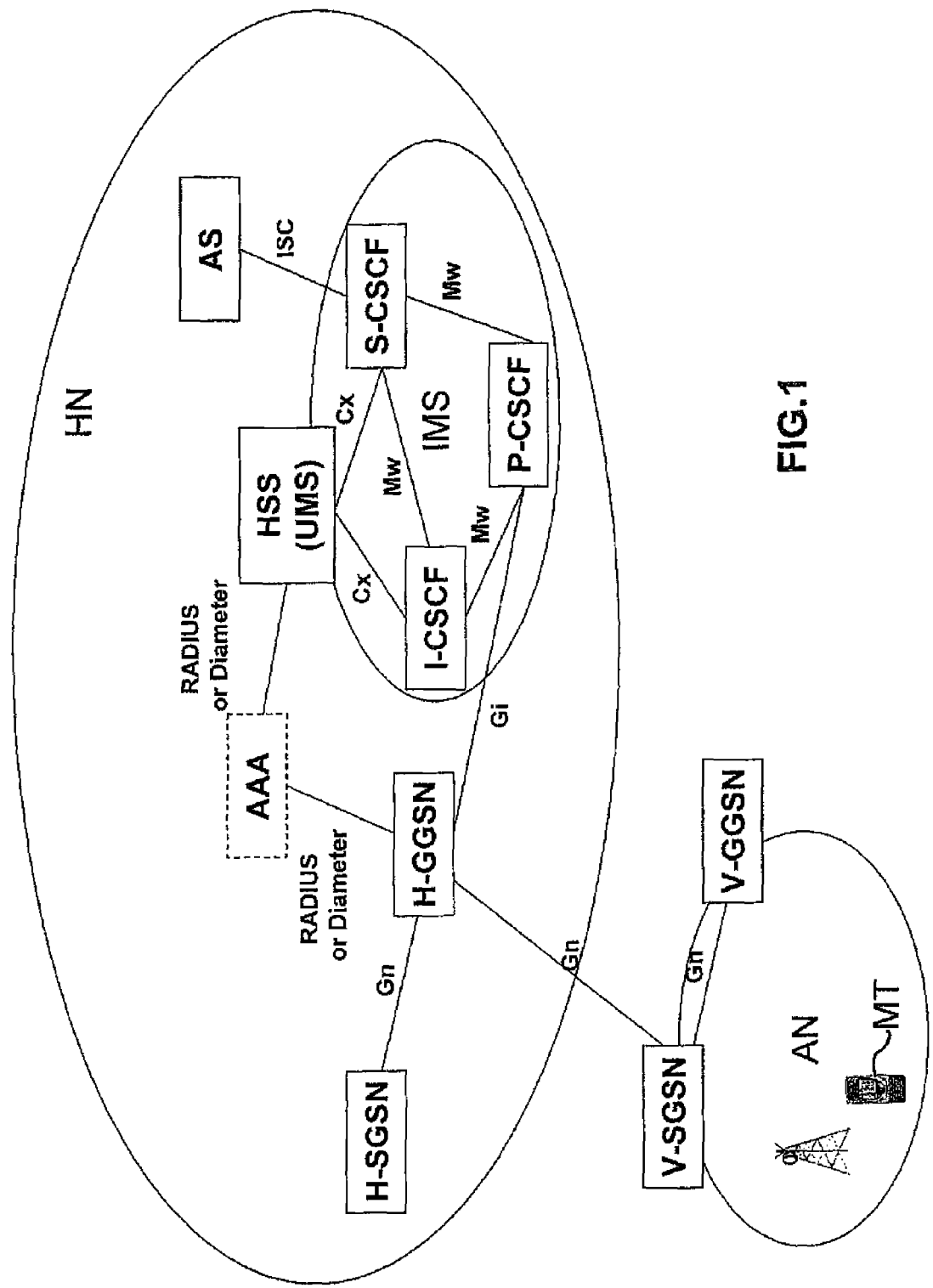

| | | |
|---|---|---|
| 2005/0007984 A1* | 1/2005 | Shaheen et al. .............. 370/338 |
| 2005/0233727 A1* | 10/2005 | Poikselka et al. .......... 455/404.2 |
| 2008/0003988 A1* | 1/2008 | Richardson ................ 455/414.3 |
| 2008/0043726 A1* | 2/2008 | Herrero-Veron et al. ..... 370/352 |
| 2008/0153457 A1* | 6/2008 | Stura et al. .................... 455/406 |
| 2008/0205381 A1* | 8/2008 | Zhu et al. ...................... 370/352 |
| 2008/0254833 A1* | 10/2008 | Keevill et al. ................. 455/558 |
| 2009/0156253 A1* | 6/2009 | Shi et al. ....................... 455/558 |
| 2011/0269421 A1* | 11/2011 | Moore et al. .................. 455/406 |

OTHER PUBLICATIONS

3GPP: "Digital cellular telecommunications system (Phase 2+); Universal Mobile Telecommunications System (UMTS); Interworking between teh Public Land Mobile Network (PLMN) supporting packet based services and Packet Data Networks (PDN) (3GPP TS 29.061 version 6.6.0 Release 6); ETSI TS 129 061" ETSI Standards, European Telecommunications Standards Institute, Sophia-Antipo, FR, vol. 3-CN3, No.

Sep. 2005, pp. 1-95, XP014031975 ISSN: 0000-0001 paragraph [13A.]—paragraph [13A.2.2.3.].

* cited by examiner

METHOD OF PROVIDING ACCESS TO AN IP MULTIMEDIA SUBSYSTEM

The present invention relates to a method of providing access to an IP multimedia subsystem for a subscriber communicating in an access communication network according to the preamble of claim 1.

Mobile communication network GSM were designed on the basis of switched circuit (CS) connection. The advent of GPRS (General Packet Radio Service) introduced packet switched (PS) connection from mobile terminals and network servers. However, the services offered to the user were still determined by the network operator.

The third generation partnership project (3GPP) has defined a new standardized architecture known as Internet Protocol (IP) Multimedia Subsystem or IMS for offering multimedia services in a packet switched based domain to end users whereby the network operator accessing to IMS services controls the services offered by the IMS.

IMS is access agnostic to the extent of the network requesting access to its services so that in a multi access environment it ensures services availability to all access networks, subject to the limitations of the access network or the specific user requesting access to IMS.

The core network of an IMS architecture comprises database elements and IMS control elements.

Home subscriber server (HSS) is the main database element of IMS and is responsible for holding user-related data such as user identification, numbering, addressing, security, location management and user profile information.

IMS control elements are call session control function (CSCF) servers which comprise proxy-CSCF (P-CSCF) which is the first point of contact for users within the IMS and is responsible for forwarding messages, particularly session initial protocol (SIP) messages, from the user to the other CSCF elements, serving-CSCF (S-CSCF) which performs registration, session control for registered end points, interaction with service platforms/application servers of IMS and interfacing to HSS for users registered therein, and interrogating-CSCF (I-CSCF) which is the contact point for external networks and is responsible for finding the appropriate S-CSCF from HSS.

In IMS roaming the packet network resources of the visited mobile telecommunication network in which a user in registered are used to connect the user to IMS core network, which may reside in the home mobile network (HPLMN) or in the visited mobile network (VPLMN). In any case, all the core elements of the IMS are always located at the home network and the subscriber is always registered with the S-CSCF of the home network for the purposes of charging and interfacing to the HSS.

When an IMS subscriber is located at his home GPRS/IMS network, he accesses IMS services through a home network access point, such as the gateway GPRS support node (GGSN).

A roaming scenario supported by IMS is the so called Home GGSN (HGGSN) model where the roaming subscriber uses the home network access point HGGSN to access IMS services. In this scenario, the subscriber is located under a visited network while user plane and control plane data are sent via the HGGSN located in the subscriber's home network.

This is a typical GPRS roaming situation where the access point HGGSN for accessing IMS services is in the home network and a GPRS tunneling protocol (GTP) is used across the inter-operator backbone network of the home and visited network.

One of the major business requirements for an operator is to apply a proper tariff to the user that are in roaming condition, both outgoing roamers as well as the incoming roamers. In particular the requirement is to identify whether a user is in roaming condition or not and eventually in which network the user is actually roaming. This requirement is not specifically addressed by 3GPP or any other standards.

A workaround would be possible by correlating HGGSN generated charging information and IMS generated charging information. However, this would eventually work for offline charging but it does not work for online charging since no OCSs (Online Charging Systems) have the ability to perform the correlation process in real-time.

It is therefore an object of the present invention to provide a method and a system for accessing to IMS so as to solve the above mentioned problem.

According to the present invention, this object is achieved by a method according to claim 1.

The method according to the invention make the IMS core network aware of the roaming condition of the subscriber and eventually in which network the subscriber is located. Moreover a mechanism to propagate the roaming information within IMS core network and to the application servers residing on the service layer of IMS ensures roaming awareness to all relevant IMS network entities.

With IMS becoming roaming aware it is possible to authorize a user to access IMS and IMS services depending on the roaming condition and eventually depending on the visited network where the subscriber is currently located. Finally, differentiated charging based on roaming information becomes possible for all services deployed on top of IMS.

Furthermore, the proposed solution works regardless the charging architecture and methods, both online and offline charging.

Figure 2:
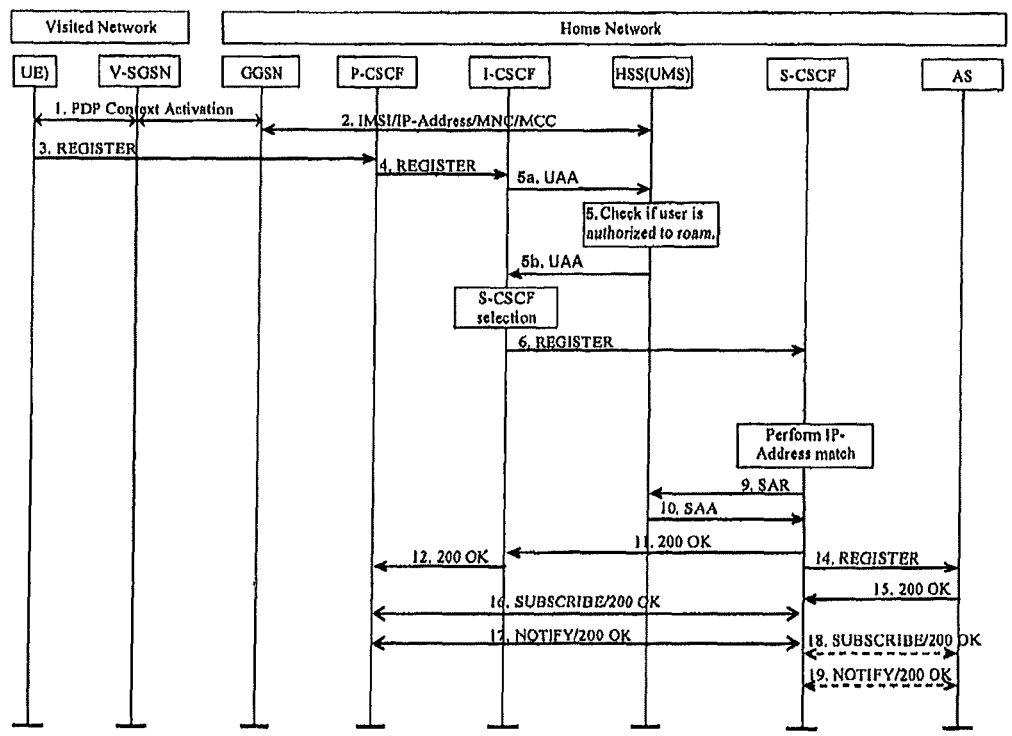

In the following, preferred embodiments of the invention will be described in detail with reference to the accompanying drawings, in which:

FIG. 1 shows schematically the elements of a communication system which allows communication between a subscriber terminal and an IP multimedia subsystem IMS in accordance with the method of the invention, and FIG. 2 shows the data exchanged between elements of the communication system of FIG. 1 to provide access to the IP multimedia subsystem IMS for the subscriber terminal.

Referring to the attached figures, a subscriber UE communicates, by means of a mobile terminal, MT, in an access communication network AN, for example a mobile GPRS or UMTS telecommunications network and requests access to an IP multimedia subsystem IMS through an interface entity HGGSN located in the home communication network HN of the subscriber UE.

In the example, the interface entity HGGSN is gateway GPRS support node.

A serving support entity SGSN, such as a serving GPRS support node, is associated with the access network AN and allows packet data to be transmitted between the subscriber UE and the access network AN.

The IP multimedia subsystem IMS is located in the home network HN of the subscriber UE and comprises serving means HSS for home subscribers storing profile data of the subscriber UE and home network data of the home communication network HN and call state control functionality means CSCF for controlling service calls within the IP multimedia subsystem IMS.

According to a preferred embodiment, the network data comprise a mobile country code and a mobile network code.

In the example, the home network data comprise a mobile country code MCC and a mobile network code MNC.

The IMS comprises also at least one application server AS which offer services to subscribers accessing to the IP multimedia subsystem IMS.

The home subscriber serving means HSS store subscriber-related data such as user identification, numbering, addressing, security, location management and user profile information. The home serving means HSS includes HLR elements, such as subscriber data and authentication data, and a new functionality as location register and IMS subscription and authentication data which are referred to as the user mobility server (UMS).

A subscription locator function SLF database may be provided in the IMS network for obtaining the HSS which stores the subscriber data of the subscriber UE, when more than one HSS is present in the IMS network.

According to a preferred embodiment, the call state control functionality means CSCF comprise an access entity P-CSCF, a control entity I-CSCF and a serving entity S-CSCF.

The access entity P-CSCF is responsible for forwarding SIP messages from the user UE to the other call state control functionality means CSCF. The access entity P-CSCF is the entry point towards the IP multimedia subsystem IMS from the access network AN and its assignment to a user UE is determined by the configuration of the mobile network requesting access to the IP multimedia subsystem IMS. As known in the art, in the case of UMTS/GPRS the allocation of a P-CSCF takes place at the packet data protocol PDP context activation.

The control entity I-CSCF is adapted to find the appropriate serving entity S-CSCF on the basis of the information stored in HSS. In fact, the primary function of the I-CSCF is the query of the HSS to know the S-CSCF which a user is to be registered with.

The serving entity S-CSCF performs registration, session control for registered end points, interaction with service platforms/application servers of IMS and interfacing to HSS.

In order to establish a communication session, the mobile terminal of the subscriber UE generates a PDP context (step 1) which defines the parameters that support the flow of data traffic to and from the mobile terminal.

A register message (steps 3,4) for registering to the IP multimedia subsystem IMS is sent from the terminal of the subscriber UE to at least one of the call state control functionality means CSCF.

When the subscriber UE (step 1 continued) wishes to access to the IP multimedia subsystem IMS, the home interface entity HGGSN is provided with the access network data identifying the access network AN.

Afterwards, the home interface means HGGSN send to the home subscriber serving means HSS a message, such as a RADIUS message, comprising such access network data (step 2).

Subsequently, the home network data and the access network data are compared to ascertain whether the subscriber is roaming or not (step 5a).

When the result of the comparison is false, that is the home network data and the access network data mismatch, the subscriber UE is roaming in the access network AN and therefore the method provides that it is checked if the subscriber UE is allowed to roam based on a set of predefined criteria (step 5a).

On the contrary, when the result of the comparison is true, that is the home network data match the access network data, the subscriber UE is not roaming so that the access network AN where it is communicating is its home network HN.

When the result of the check is true so that the subscriber is allowed to roam a message comprising the access network data is sent to at least one of the call state control functionality means CSCF (step 6).

On the contrary, when the result of the check is false so the subscriber is not allowed to roam, a error message is sent to the subscriber terminal.

Advantageously, the home network data and the access network data comprise at least a respective mobile country code MCC,MCC'. In this case, the result of comparison is false when the mobile country codes MCC,MCC' differs.

More advantageously, the home network data and the access network data comprise a respective mobile network code MNC,MNC'. In this case, the result of the comparison is false even when the mobile country codes MCC,MCC', match and the mobile network codes MNC,MNC' differ.

The mobile country codes may be sufficient for establishing whether the subscriber UE is roaming or not, for example if they differ. However, in order to know the specific access network AN where the subscriber UE is roaming, both the country code MCC and the network code MNC are required since the same network code MNC may be used in different countries and, on the other hand, several different network may exist in each country.

Preferably, the checking is performed by comparing the access network data MCC',MNC' with a predefined list of allowed access network data, such as a list of access network data corresponding to operator being partners of the home network operator of the subscriber.

The access network data MCC',MNC' may be stored into the home subscriber serving means HSS.

According to a preferred embodiment, the home interface entity HGGSN receives the access network data, such as mobile country code MCC' and mobile network code MNC', from the serving support entity SGSN in the access network AN (step 2).

Alternatively, the home interface entity HGGSN comprises storing means (not shown in the figures) for storing a plurality of IP addresses $IP_n$ and a corresponding plurality of network data $MCC_n, MNC_n$. In this case, the home interface entity HGGSN receives the IP_AN address of the serving support entity SGSN and associates to such IP address IP_AN the access network data MCC' and MNC' (step 2).

For example, a mapping table may be provided in the home interface entity HGGSN for associating to the IP address IP_AN of the serving support entity SGSN the corresponding pair of codes MCC' and MNC'. It may be assumed that for all roaming partners of a given operator which are known to not send the MCC' and MNC', codes, there is a row in the mapping table which consists of an IP subnet and the corresponding MCC' and MNC' codes.

The access network data MCC',MNC' may be transported within an appropriate RADIUS attribute, such as for example the 3GPP-SGSN-MCC-MNC attribute value pair (AVP).

In case of early IMS security, the message sent from the home interface entity HGGSN to the serving means HSS is the same RADIUS message used to send the IMSI (International Mobile Subscriber Identifier)/IP address security binding.

According to a preferred embodiment, the serving support entity SGSN of the mobile network AN where the subscriber UE is communicating with sends the MCC' and MNC' codes to the home interface entity HGGSN, for example by a GTP message.

The RADIUS message containing access network data MCC', MNC' reaches the home subscriber means HSS, specifically the UMS register, where the two code MCC',MNC' are stored. The access network data or roaming information MNC' and MCC' are preferably stored in the HSS, particularly, in the UMS, in association with the user identity data of the subscriber UE, such as the IMSI or MSISDN.

Subsequently, as stated above, depending on the comparison of the home network data MCC,MNC and the access network data MCC',MNC' and on a set of predefined criteria, the home subscriber serving means HSS authorize or deny access of the subscriber UE to the IP multimedia subsystem IMS and send this information to the serving entity S-CSCF via an interface, such as a Cx interface or by other equivalent means.

In particular, if the roaming information MNC' and MCC' stored in the serving means HSS for the subscriber UE communicating in the mobile network AN differ from the MNC and MCC codes of the home network of the IP multimedia subsystem IMS, the serving means HSS recognize that the subscriber UE is roaming in a visited network, that is the access network AN. In this case, the serving means HSS checks if the subscriber UE is allowed to roam and, if it is allowed to roam, checks if the subscriber UE is allowed to roam in the access network AN.

Additional provisions may be set up for allowing or denying authorization to the IP multimedia subsystem IMS to a specific subscriber UE depending on subscriber identity data and the particular mobile network AN, identified by the roaming information MCC',MNC', where the subscriber UE is roaming.

It should be noted that there may be an Authentication Authorization Accounting (AAA) server or a Diameter translation agent or an AAA server acting as Diameter translation agent between the home interface entity HGGSN and the serving means HSS.

The serving entity S-CSCF propagates (steps 11,12, 14-19) the roaming information MCC' and MNC' within the IMS core entities and the possible trusted application servers, for example the application server AS, using an appropriate header, such as a P-Visited-Network-Id header.

By this way, all IMS core entities include MCC and MNC code in generated charging information, for both online and offline charging.

FIG. 2 illustrates an application of the method of the present invention for the home GGSN model where early IMS security is used.

Firstly, the HSS checks (step 5a) if the subscriber UE is allowed to roam upon reception of a User-Authorization-Request (UAR) message (step 5). If the subscriber UE is not allowed to roam or if it is not allowed to roam in the mobile network AN, the HSS rejects the authorization request by sending an error message, that is User-Authorization-Answer (UAA) (step 5b) including an error code such as "DIAMETER_ERROR_ROAMING_NOT_ALLOWED".

This check is performed based on the roaming information, MCC' and MCC' codes, stored in HSS for the subscriber UE subscription, i.e. the MCC' and MNC' received from the home interface entity HGGSN.

It comes out that the IMS access and registration of the subscriber UE may be accepted or rejected simply based on roaming status (allowed/denied or not_allowed) or based on a list of networks where roaming is allowed.

Where the home GGSN roaming model is active in HSS and the roaming information MCC' and MNC' is not available at the initial IMS registration of a subscriber, for example if the roaming information is not received from the home interface entity HGGSN, the operator may be able to decide whether to accept or reject the IMS registration of the subscriber UE based on configuration parameters.

In case the roaming information MCC' and MNC' is available as stored in HSS when the SAR message (step 9) is received from the HSS, the HSS sends the said roaming information MCC' and MNC' in SAA message to the S-CSCF (step 10).

The roaming information MCC' and MNC' may also be sent within a 3GPP-SGSN-MCC-MNC attribute derived from the 3GPP specific RADIUS attribute defined in 3GPP TS 29.061 or within any other appropriate attribute.

Where the roaming information MCC' and MNC' is received from the HSS, the S-CSCF populates an appropriate header such as, for example, the P-Visited-Network-Id Header in the 200 OK of a message, for example the REGISTER message (steps 14,15).

IMS entities I-CSCF and P-CSCF in the path to the subscribe UE store this roaming information MCC' and MNC' so that all entities of the IP multimedia subsystem IMS are aware of the roaming condition of the subscriber UE.

The access entity P-CSCF strips the P-Visited-Network header or any other P-Header used to transport the roaming information MCC' and MNC' before sending any message to the subscriber UE. The P-Visited-Network-Id header may be populated as a dotted separated concatenation of the MNC and MCC as follow: mnc<MNC>.mcc<MCC>.3gppnetwork.org.

As it will be described more in detail in the following, the access entity P-CSCF receives the roaming information MNC' and MCC' also within the notification to the register event (steps 16,17).

The serving entity S-CSCF includes the P-Visited-Network-Id header or any other P-Header appropriate to carry the roaming information MCC' and MNC' in third party REGISTER message sent to trusted AS (steps 14,15).

Particularly, if an application server AS is interested in receiving changes in roaming status, it may subscribe to a registration event package. In this case, the roaming information MNC' and MCC' is carried within a P-Visited-Network-Id header or any other appropriate P-Header included in the NOTIFY request (step 19). The AS stores the received roaming information MNC' and MCC' associated to the registered public user identities indicated within the body of the NOTIFY (step 19).

The serving entity S-CSCF or an IP multimedia gateway (IP-GW) includes the roaming information MCC' and MNC' when it generates online charging requests.

When they generates offline charging requests or Charging Data Record (CDR), call session control function means CSCF includes the roaming information MNC' and MCC'.

In case the HSS receives a new roaming information MNC' and MCC', for example because the subscriber UE changed its roaming status, the HSS updates the S-CSCF by sending a Push-Profile-Request (PPR) including the new roaming information MNC' and MCC' for instance within a 3GPP-SGSN-MCC-MNC attribute.

The S-CSCF considers the receipt of this attribute as a change in registration status of the subscriber UE and stars notification to the application servers AS and the other authorized entities of the IMS, such as the P-CSCF, that subscribed to the registration event package.

It should be noted that S-CSCF may record the changes in roaming status into the offline charging requests or CDRs it generates or may trigger an Accounting-Request (ACR) on an appropriate interface, such as the Rf interface, including the new roaming information MNC' and MCC'.

If online charging is performed for the subscriber, the S-CSCF may report the new roaming information MNC' and MCC' together with used-units, such as the quota consumed until the change in roaming status, to the OCS.

Finally, the subscribers to the registration event, such as the P-CSCF and the AS, receive the notification of changing in roaming status and replace the previously stored roaming information MNC' and MCC' with the new roaming information MNC' and MCC' included in the latest received P-Visited-Network-Id header or any other appropriate P-Header that may transports the roaming information. As a result of the above defined procedure the SAA and PPR commands defined in 3GPP TS 29.229 are added with the roaming information MNC and MCC.

However, any other appropriate attribute may be used to carry the roaming information MNC' and MCC'.

From the discussion above, it should be clear to those skilled in the art that the embodiment of the method and system described allows the IMS entities to become aware of the roaming condition and in which network a subscriber requesting access to the IMS network is located.

Moreover, the solution described allow the roaming information to be propagated within IMS entities and to the application servers residing on the service layer of IMS thereby ensuring roaming awareness to all relevant IMS network entities.

With IMS becoming roaming aware it is possible to authorize a user to access IMS and IMS services depending on the roaming condition and eventually depending on the visited network where the subscriber is currently located.

Finally, differentiated charging based on roaming information becomes possible for all services deployed on top of IMS. Furthermore, as discussed above, the invention works both with online and offline charging methods.

The present invention allows standards IMS network to be used without need of a specific proprietary node or function within the IMS network except for the implementation of the specific method of the invention as described for the roaming awareness of the IMS network and its entities. The solution according to the present invention may therefore be implemented and integrated in existing IMS networks without requiring any support from the roaming partner network.

While the invention has been described with reference to a preferred embodiment, the description is illustrative of the invention and is not to be construed as limiting the invention. Various modifications and applications may occur to those skilled in the art without departing from the scope of the invention as defined by the appended claims.

The invention claimed is:

1. Method of providing access to an IP multimedia subsystem for a subscriber communicating in an access communication network and requesting access to said IP multimedia subsystem through a home interface entity located in the home communication network of said subscriber, said IP multimedia subsystem being a packet switched based domain located in said home communication network and comprising serving means for home subscribers storing profile data of said subscriber and home network data identifying said home communication network and call state control functionality means controlling service calls within said IP multimedia subsystem, the method comprising the steps of:

providing said home interface entity with access network data identifying said access communication network;
sending a message comprising said access network data from said home interface entity to said serving means;
comparing said home network data and said access network data in said home communication network of said subscriber;
checking if said subscriber is allowed to roam based on a set of predefined criteria when the result of said comparing step is false;
sending a message comprising said access network data to at least one of said call state control functionality means when the result of said checking step is true.

2. Method of providing access to an IP multimedia subsystem according to claim 1, wherein the result of said comparing step is false when said home network data and said access network data mismatch.

3. Method of providing access to an IP multimedia subsystem according to claim 1, wherein said home network data and said access network data comprise at least a respective mobile country code, the result of said comparing step being false when said mobile country codes differ.

4. Method of providing access to an IP multimedia subsystem according to claim 2, wherein said home network data and said access network data comprise at least a respective mobile country code, the result of said comparing step being false when said mobile country codes differ.

5. Method of providing access to an IP multimedia subsystem according to claim 1, wherein said home network data and said access network data comprise a respective mobile network code, the result of said comparing step being false when said mobile country codes match and said mobile network codes differ.

6. Method of providing access to an IP multimedia subsystem according to claim 2, wherein said home network data and said access network data comprise a respective mobile network code, the result of said comparing step being false when said mobile country codes match and said mobile network codes differ.

7. Method of providing access to an IP multimedia subsystem according to claim 1, wherein said checking step comprises the step of comparing said access network data with a predefined list of allowed access network data.

8. Method of providing access to an IP multimedia subsystem according to claim 1, further comprising the step of sending an error message to the subscriber terminal when the result of said checking step is false.

9. Method of providing access to an IP multimedia subsystem according to claim 1, comprising, before the providing step, the step of sending a register message for registering to said IP multimedia subsystem from the subscriber terminal to at least one of said call state control functionality means.

10. Method of providing access to an IP multimedia subsystem according to claim 1, comprising, before the comparing step, the step of storing said access network data into said serving means.

11. Method of providing access to an IP multimedia subsystem according to claim 1, wherein said subscriber communicates with said access communication network through a serving support entity.

12. Method of providing access to an IP multimedia subsystem according to claim 11, wherein said providing step comprises the step of receiving at said interface entity said access network data from said serving support entity.

13. Method of providing access to an IP multimedia subsystem according to claim 11, wherein said interface entity comprises storing means for storing a plurality of IP addresses and a corresponding plurality of network data, said providing step comprises the steps of:

receiving at said interface entity the IP address of said serving support entity;

associating to said IP address of said serving support entity said access network data.

14. Method of providing access to an IP multimedia subsystem for a subscriber communicating in an access communication network and requesting access to said IP multimedia subsystem through a home interface entity located in the home communication network of said subscriber, said IP multimedia subsystem being a packet switched based domain located in said home communication network and comprising serving means for home subscribers storing profile data of said subscriber and home network data identifying said home communication network and call state control functionality means controlling service calls within said IP multimedia subsystem, the method comprising the steps of:

provided said home interface entity with access network data identifying said access communication network;

sending a message comprising said access network data from said home interface entity to said serving means;

comparing said home network data and said access network data in said home communication network of said subscriber;

checking if said subscriber is allowed to roam based on a set of predefined criteria when the result of said comparing step is false;

sending a message comprising said access network data to at least one of said call state control functionality means when the result of said checking step is true;

determining the roaming condition of the subscriber when the result of said checking step is true; and determining the differential charging condition of the subscriber based on the roaming condition of the subscriber.

\* \* \* \* \*